United States Patent
Noma

(10) Patent No.: US 10,657,183 B2
(45) Date of Patent: May 19, 2020

(54) INFORMATION PROCESSING APPARATUS, SIMILARITY SEARCH PROGRAM, AND SIMILARITY SEARCH METHOD

(71) Applicant: FUJITSU LIMITED, Kawasaki-shi, Kanagawa (JP)

(72) Inventor: Yui Noma, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 354 days.

(21) Appl. No.: 15/426,340

(22) Filed: Feb. 7, 2017

(65) Prior Publication Data

US 2017/0262552 A1 Sep. 14, 2017

(30) Foreign Application Priority Data

Mar. 10, 2016 (JP) .................. 2016-047524

(51) Int. Cl.
- *G06F 16/903* (2019.01)
- *G06N 20/00* (2019.01)
- *G06N 20/10* (2019.01)

(52) U.S. Cl.
CPC ....... *G06F 16/90335* (2019.01); *G06N 20/00* (2019.01); *G06N 20/10* (2019.01)

(58) Field of Classification Search
CPC .......................... G06F 16/90335; G06N 20/00
See application file for complete search history.

(56) References Cited

U.S. PATENT DOCUMENTS

| 6,961,719 B1* | 11/2005 | Rai | G06N 3/0454 |
| | | | 706/21 |
| 7,318,051 B2* | 1/2008 | Weston | G06K 9/6215 |
| | | | 706/12 |
| 7,325,001 B2* | 1/2008 | Goldstein | G06F 16/2264 |

(Continued)

FOREIGN PATENT DOCUMENTS

| JP | 2006-252333 | 9/2006 |
| JP | 2013-109479 | 6/2013 |

OTHER PUBLICATIONS

Torralba et al., "Small Codes and Large Image Databases for Recognition", In CVPR, IEEE, 2008, pp. 1-8.

(Continued)

*Primary Examiner* — Miranda Le
(74) *Attorney, Agent, or Firm* — Staas & Halsey LLP

(57) ABSTRACT

A similarity search method that causes a computer to perform a process, the process includes: first calculating, based on a plurality of record data, each of the record data including a plurality of feature quantities, normal hyperplane data representing a normal hyperplane, the normal hyperplane being a hyperplane dividing a feature quantity space, and a distance between a pair of divided areas having symmetry, second calculating, based on the plurality of record data and the normal hyperplane data, one-way hyperplane data representing at least one one-way hyperplane, the one-way hyperplane being a hyperplane dividing the feature quantity space, and a distance between a pair of divided areas having asymmetry, and converting, based on the (Continued)

normal hyperplane data and the one-way hyperplane data, query data including a plurality of feature quantities and the plurality of record data into respective binary strings.

11 Claims, 13 Drawing Sheets

(56) References Cited

U.S. PATENT DOCUMENTS

| | | | | |
|---|---|---|---|---|
| 7,356,187 | B2* | 4/2008 | Shanahan | G06F 16/3347 382/224 |
| 7,490,071 | B2* | 2/2009 | Milenova | G06F 16/284 706/45 |
| 7,542,959 | B2* | 6/2009 | Barnhill | G06K 9/6228 706/48 |
| 7,623,685 | B2* | 11/2009 | Boult | G06K 9/00375 382/115 |
| 7,720,291 | B2* | 5/2010 | Trifonov | G06K 9/6234 382/159 |
| 7,966,327 | B2* | 6/2011 | Li | G06F 16/90335 707/737 |
| 8,090,712 | B2* | 1/2012 | Shellshear | G06F 3/0481 707/723 |
| 8,160,366 | B2* | 4/2012 | Nakamura | G06K 9/6211 348/169 |
| 8,214,157 | B2* | 7/2012 | Moser | G06K 9/6298 702/19 |
| 8,488,883 | B2* | 7/2013 | Gutelzon | G06K 9/4671 382/176 |
| 8,675,877 | B2* | 3/2014 | Schneider | H04L 9/085 380/255 |
| 8,737,685 | B2* | 5/2014 | Becker | G06T 7/254 382/103 |
| 8,924,391 | B2* | 12/2014 | Johnston | G06F 16/353 707/738 |
| 9,152,862 | B2* | 10/2015 | Ross | G06K 9/00577 |
| 2005/0002568 | A1* | 1/2005 | Chupeau | G06K 9/6211 382/190 |
| 2007/0201822 | A1* | 8/2007 | Kusunoki | G11B 20/10 386/297 |
| 2007/0244870 | A1* | 10/2007 | Laurent | G06F 16/58 |
| 2008/0177763 | A1* | 7/2008 | Lang | G06F 16/444 |
| 2011/0142299 | A1* | 6/2011 | Akbarzadeh | G06K 9/00288 382/118 |
| 2014/0334719 | A1* | 11/2014 | Takenaka | G06K 9/00369 382/159 |
| 2015/0332173 | A1 | 11/2015 | Konoshima et al. | |
| 2016/0180196 | A1* | 6/2016 | Taylor | G06K 9/6215 382/103 |

OTHER PUBLICATIONS

Chern et al., "Lectures on Differential Geometry", Series on University Mathematics—vol. 1, 1999, pp. 133-143.
Kulis et al., "Learning to Hash with Binary Reconstructive Embeddings", In NIPS 22, 2009, pp. 1-9.
Norouzi et al., "Hamming Distance Metric Learning", In NIPS 25, 2012, pp. 1-9.

* cited by examiner

| QUASI-METRIC FUNCTION IDENTIFIER | NUMERIC PARAMETER |
|---|---|
| 001 | (0.1, 0.0, 0.01) |
| 002 | (0.04, 0.1, 0.001) |
| 003 | (0.02, −0.03, −0.01) |
| 004 | (0.07, 0.001, 0.0) |
| ⋮ | ⋮ |

| HYPERPLANE IDENTIFIER | NORMAL VECTOR | OFFSET |
|---|---|---|
| 001 | (12.0, 4.1, 6.4) | 0 |
| 002 | (14.2, 14.3, -6.6) | -0.1 |
| 003 | (6.8, 6.6, -7.9) | 0.2 |
| 004 | (8.8, 9.0, -1.9) | 0.04 |
| ⋮ | ⋮ | ⋮ |

```
     | 0 | 0 | 1 | 1 | 1 | 0 | 1 | 1 |
XOR  | 0 | 1 | 1 | 0 | 1 | 1 | 1 | 0 |
     ─────────────────────────────────
     | 0 | 1 | 0 | 1 | 0 | 1 | 0 | 1 |  ⟹  4
                                          POPULATION COUNT
```

| INPUT | OUTPUT |
|---|---|
| a1 | 0 |
| a2 | 1 |
| q1 | 0 |
| q2 | 1 |

| x | y | $\vec{b_q}(x) \cdot \vec{b_q}(y)$ |
|---|---|---|
| q1 | a1 | 0 |
| q1 | a2 | 0 |
| q2 | a1 | 1 |
| q2 | a2 | 0 |

AND(·, NOT(·))
$\vec{b_q}(q)$ | 0 | 0 | 1 | 1 | 1 | 0 | 1 | 1
$\vec{b_q}(r)$ | 0 | 1 | 1 | 0 | 1 | 1 | 0 | 0

| 0 | 0 | 0 | 1 | 0 | 0 | 1 | 1 | ⇒ 3 POPULATION COUNT

AND(·, NOT(·))
$\vec{b_q}(q)$ | 0 | 1 | 1 | 0 | 1 | 1 | 0 | 0
$\vec{b_q}(r)$ | 0 | 0 | 1 | 1 | 1 | 0 | 1 | 1

| 0 | 1 | 0 | 0 | 0 | 1 | 0 | 0 | ⇒ 2 POPULATION COUNT

| START POINT \ END POINT | A | B | C | D |
|---|---|---|---|---|
| A | 0 | 0 | 0 | 0 |
| B | 1 | 0 | 1 | 0 |
| C | 1 | 1 | 0 | 0 |
| D | 2 | 1 | 1 | 0 |

| START POINT \ END POINT | A | B | C | D |
|---|---|---|---|---|
| A | 0 | 1 | 1 | 2 |
| B | 2 | 0 | 3 | 1 |
| C | 2 | 3 | 0 | 1 |
| D | 4 | 2 | 2 | 0 |

34

| HYPERPLANE IDENTIFIER | TYPE | NORMAL VECTOR | OFFSET | |
|---|---|---|---|---|
| 001 | N | (12.0, 4.1, 6.4) | 0 | } 36 |
| 002 | N | (14.2, 14.3, -6.6) | -0.1 | |
| 003 | Q | (12.0, 4.1, 6.4) | 0 | } 38 |
| 004 | Q | (-14.2, -14.3, 6.6) | 0.1 | |
| ⋮ | ⋮ | ⋮ | ⋮ | |

| HYPERPLANE IDENTIFIER | NORMAL VECTOR | OFFSET | THE NUMBER OF ONE-WAY HYPERPLANES |
|---|---|---|---|
| 001 | (12.0, 4.1, 6.4) | 0 | 1 |
| 002 | (14.2, 14.3, -6.6) | -0.1 | -1 |
| 003 | (6.8, 6.6, -7.9) | 0.2 | 0 |
| 004 | (8.8, 9.0, -1.9) | 0.04 | 3 |
| ⋮ | ⋮ | ⋮ | ⋮ |

| DATA IDENTIFIER | FEATURE VECTOR | BINARY STRING b | BINARY STRING $b_q$ |
|---|---|---|---|
| 001 | (2.0, 4.1, 6.4) | (0, 1, 1, 0) | (0, 1, 1) |
| 002 | (24.2, 14.3, 96.6) | (0, 0, 1, 1) | (0, 1, 0) |
| 003 | (20.8, 6.6, 7.9) | (1, 1, 0, 0) | (1, 0, 0) |
| 004 | (120.8, 16.6, 17.9) | (1, 0, 1, 0) | (1, 1, 1) |
| ⋮ | ⋮ | ⋮ | ⋮ |

INFORMATION PROCESSING APPARATUS, SIMILARITY SEARCH PROGRAM, AND SIMILARITY SEARCH METHOD

CROSS-REFERENCE TO RELATED APPLICATION

This application is based upon and claims the benefit of priority of the prior Japanese Patent Application No. 2016-047524, filed on Mar. 10, 2016, the entire contents of which are incorporated herein by reference.

FIELD

The embodiments discussed herein are related to an information processing apparatus, a similarity search program, and a similarity search method.

BACKGROUND

A technique is known in which each feature quantity of a plurality of pieces of content is distributed in a feature quantity space as a feature point and is classified into at least two groups, and a line or a hyperplane having an identical vertical distance from all the feature points in each group is obtained. In this technique, a hash function that converts the content to a binary value is created based on which of the spaces divided by the obtained line or hyperplane the feature point is positioned in.

Also, a technique is known in which similarity degree data indicating the similarity between the learned data used for creating learning data and unprocessed data is created for each of a plurality of learning data. In this technique, a part of learning data among the plurality of learning data is selected based on the created similarity degree data, and machine learning processing is performed on the processed data using the selected learning data.

Also, a technique is known in which a data pair is created from each feature quantity vector included in a learning data set, and a hyperplane that divides a feature quantity vector space is learned using the created data pair. Related-art techniques are disclosed in Japanese Laid-open Patent Publication Nos. 2013-109479 and 2006-252333, and International Publication Pamphlet No. WO 2014118976.

A problem described later arises when the similarity is calculated in the following case. A plurality of record data including a plurality of feature quantities are obtained and stored in a database in advance. Query data including a plurality of feature quantities is obtained. The similarity between each record data and the query data is calculated, and the record data having the maximum similarity is extracted. In general, the dissimilarity between each data is roughly corresponding to the distance between each data in a feature quantity space, and it is possible roughly to determine the similarity between each data from the distance between each data in a feature quantity space. In this regard, in this specification, data that is stored in the database as a matching target in advance and that includes a plurality of feature quantities is referred to as "record data", and data that is obtained and input in order to be matched with the record data and that includes a plurality of feature quantities is referred to as "query data".

However, the acquisition conditions of query data sometimes changes from the time of obtaining the record data. In this case, the position of the query data in a feature quantity space changes, and thus the distance between the query data and the individual record data changes unequally in the feature quantity space. Accordingly, the determination precision of the similarity deteriorates. That is to say, for example, the record data that does not have the shortest distance from the query data in a feature quantity space at first might be erroneously extracted as the record data having the maximum degree of the similarity with a change in the position of the query data.

According to an aspect of the disclosed technique, it is desirable to make it possible to reduce deterioration of the determination precision of the similarity when acquisition conditions of data are changed.

SUMMARY

According to an aspect of the invention, a similarity search method that causes a computer to perform a process, the process includes: first calculating, based on a plurality of record data, each of the record data including a plurality of feature quantities, normal hyperplane data representing a normal hyperplane, the normal hyperplane being a hyperplane dividing a feature quantity space, and a distance between a pair of divided areas having symmetry, second calculating, based on the plurality of record data and the normal hyperplane data, one-way hyperplane data representing at least one one-way hyperplane, the one-way hyperplane being a hyperplane dividing the feature quantity space, and a distance between a pair of divided areas having asymmetry, and converting, based on the normal hyperplane data and the one-way hyperplane data, query data including a plurality of feature quantities and the plurality of record data into respective binary strings.an apparatus includes The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 25 is a diagram illustrating an example of hyperplane data according to a variation;

FIG. 26 is a diagram illustrating an example of record data; and

DESCRIPTION OF EMBODIMENTS

Figure 1:
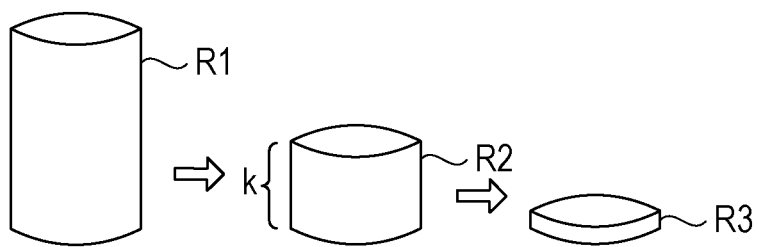
FIG. 1 is a diagram for explaining narrowing down record data by calculating the dissimilarity using binary strings.

In the following, a detailed description will be given of an example of an embodiment of the disclosed technique with reference to the drawings. In this regard, in the present embodiment, a description will be given of the case where the disclosed technique is applied to fingerprint authentication.

In the determination processing of the similarity of unstructured data, such as image data, audio data, sensor data, or the like, feature vectors having a plurality of feature quantities that are extracted from the data as their elements are often used. In the determination processing of the similarity, the similarity or the dissimilarity between the feature vectors is often calculated.

Also, in the matching between query data and record data, each data changes depending on the environmental conditions of the target whose data is to be obtained, and the like. For example, each data changes by the lighting condition in the case of image data, and by the ambient noise and the drying degree of the atmosphere, and the like in the case of audio data. Also, each data changes by the state of the target whose data is to be obtained. For example, each data changes by the health state of a user's throat in the case of voice recognition, by the health state of user's legs in the case of gait recognition, and by the skin state due to the body condition and the facial expression due to the feeling in the case of face image authentication, and the like.

Also, when these changes are regarded as changes in the feature vectors that are extracted from the data, there are a direction in which the changes easily occur and a direction in which the changes hardly occur. That is to say, in the processing in which the similarity or the dissimilarity between feature vectors is calculated in order to determine the similarity, if the similarity is determined without considering the direction of the change in the feature vector, the determination precision of the similarity sometimes deteriorates. More specifically, it is assumed that the feature vector obtained in a normal state is x, the feature vector obtained in a state changeable from the normal state is y, and the feature vector obtained in a state unchangeable from the normal state is z. In this case, if the similarity between x and y, and the similarity between x and z are equally processed, the determination precision of the similarity sometimes deteriorates.

Incidentally, when feature vectors are calculated from the image data obtained by capturing the image of a fingerprint and are used for fingerprint authentication, the feature vectors often have to be high dimensional vectors, such as from 10-dimensional vectors to 1000-dimensional vectors. In this case, the processing for calculating the similarity between the feature vectors of query data and the feature vectors of multiple record data often takes a long time.

Also, in the determination processing of the similarity between high dimensional feature vectors, a method of converting the feature vectors to binary strings is known as a method of speeding up the processing (refer to A. Torralba, R. Fergus, and Y. Weiss, "Small codes and large image databases for recognition", in CVPR, 2008). In this method, the Hamming distance between the converted binary strings is calculated as the dissimilarity between the feature vectors. In this regard, the dissimilarity mentioned here means that the lower the dissimilarity (that is to say, the shorter the Hamming distance), the more they are similar.

Thus, in the present embodiment, the feature vectors of query data and record data are converted to respective binary strings, and the dissimilarity between the binary strings are calculated. As illustrated in FIG. 1, a predetermined number (k in FIG. 1) of record data R2 are extracted from record data R1 in ascending order of the calculated dissimilarity. Further, in the present embodiment, the similarity between each of the record data R2 and the query data is calculated. In this manner, in the present embodiment, the record data R1 is narrowed down to a predetermined number of record data R2 by the relatively high-speed calculation processing of the dissimilarity between the binary strings. Next, each of the record data R2 that have been narrowed down is subjected to the relatively time-consuming calculation processing of the similarity with the query data. If the similarity of the record data R3 having the maximum degree of similarity is equal to or higher than a predetermined value, it is determined that the matching result is normal.

Figure 2:
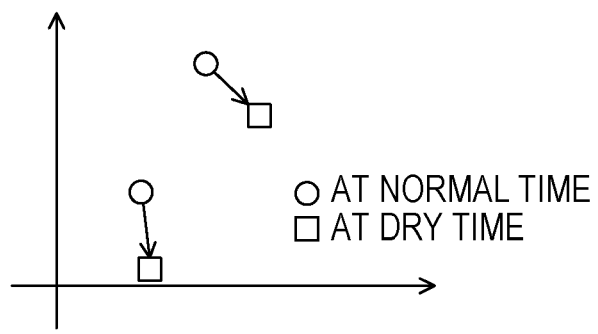
FIG. 2 is a diagram illustrating an example of the difference between feature vectors at normal time and at dry time.

Incidentally, in fingerprint authentication, the feature vector calculated from the image data obtained by capturing the image of a fingerprint changes depending on the environmental condition, or the like. As illustrated in FIG. 2, as an example, even if the feature vectors are calculated from the image data obtained by capturing the image of the same fingertip of the same person, the feature vector changes between the case where the air humidity is normal at the time of capturing the image (at normal time) and the case of dry air (at dry time). In this regard, FIG. 2 is a schematic diagram in which each of the feature vectors at normal time and at dry time are mapped in the feature vector space (in the feature quantity space of the disclosed technique) for each of the feature vectors corresponding to two different fingerprints. The circles denote the feature vectors at normal time, and the squares denote the feature vectors at dry time.

Figure 3:
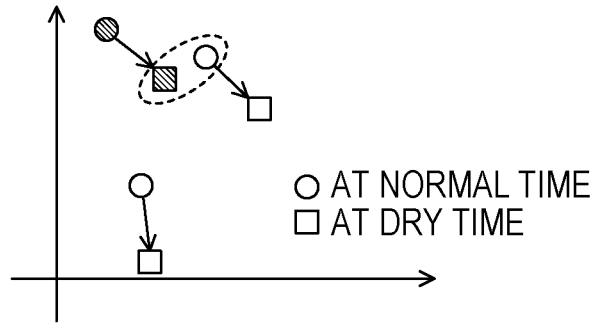
FIG. 3 is a diagram for explaining the case in which an erroneous determination occurs due to the difference between feature vectors at normal time and at dry time.
Figure 4:
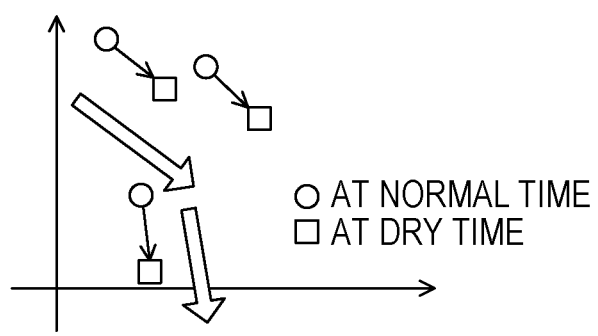
FIG. 4 is a diagram for explaining a direction in which a feature vector easily moves.

Here, with reference to FIG. 3, a description will be given of the case where for example, the feature vector is calculated from the image data obtained by capturing the image of a fingerprint at normal time and is stored as record data, and then the feature vector is calculated from the image data by capturing the image of a fingerprint at dry time and is used as query data. In this regard, in FIG. 3, the feature vector of the query data to be matched and the feature vector of the record data corresponding to the query data are illustrated with hatching. In this case, as illustrated in FIG. 3, for example, it is sometimes determined that the query data is more similar to another record data at normal time than the record data to be the target of the query data at normal time. As a result, when a predetermined number of record data are extracted, the record data corresponding to the query data is sometimes not extracted. Thus, in the present embodiment, as illustrated in FIG. 4 by a broad arrow as an example, the above-described dissimilarity is calculated in consideration of the direction in which the feature vector easily changes.

Next, a description will be given of the technique used in the present embodiment.

First, a description will be given of the distance between feature vectors. The distance that represents the dissimilarity between feature vectors is a function d that satisfies the following four axioms, (A) to (D), in any set S.

(A) $d(x[v], y[v]) \geq 0$ for $x[v], y[v] \in S$
(B) $d(x[v], y[v]) = 0 \Rightarrow x[v] = y[v]$
(C) $d(x[v], y[v]) = d(y[v], x[v])$
(D) $d(x[v], y[v]) \geq d(x[v], z[v]) + d(z[v], y[v])$ In this regard, a character given [v] at the end, such as x[v] and y[v], is represented by a symbol given an arrow (→) above the character (x or y) in the following expression, and indicates that the character is a vector.

As an example of the distance, the Euclidean distance is given, and the Euclidean distance Euc between the two feature vectors $x[v](x_1, x_2, x_3)$ and $y[v](y_1, y_2, y_3)$ is obtained by the following expression (1).

$$\mathrm{Euc}(\vec{x}, \vec{y}) = \sqrt{((x_1-y_1)^2 + (x_2-y_2)^2 + (x_3-y_3)^2)} \quad (1)$$

Also, it is thought that a quasi-metric is used as the dissimilarity between feature vectors. A quasi metric is produced by removing the axiom of symmetry (the above-described (C)) in the distance axioms from the above-described distance, and is a function $d_q$ that satisfies the following three axioms, (a) to (c). In this regard, (a) and (b) are the positive definiteness of the quasi metric.

(a) $d_q(x[v], y[v]) \geq 0$ for $x[v], y[v] \in S$
(b) $d_q(x[v], y[v]) = 0 \Rightarrow x[v] = y[v]$
(c) $d_q(x[v], y[v]) \leq d_q(x[v], z[v]) + d_q(z[v], y[v])$ For example, when a round trip is made between a house located on the top of a sloping road and a station located on the bottom of the sloping road, the time period spent for going differs from the time period spent for returning. The time period in this case corresponds to an example of quasi metric. It is possible to symmetrize and anti-symmetrize a quasi-metric using the following expressions (2) and (3).

$$d_{sym}(\vec{x}, \vec{y}) := \frac{1}{2}(d_q(\vec{x}, \vec{y}) + d_q(\vec{y}, \vec{x})) \quad (2)$$

$$d_{asym}(\vec{x}, \vec{y}) := \frac{1}{2}(d_q(\vec{x}, \vec{y}) - d_q(\vec{y}, \vec{x})) \quad (3)$$

A symbol $d_{sym}$ is a symmetric component of the quasi metric, and a symbol $d_{asym}$ is an asymmetric component of the quasi metric. The symmetric component $d_{sym}$ satisfies the above-described distance axiom. That is to say, it is possible to say that a quasi-metric represents a movement cost in the distance including symmetric components when there is something that gives an impact on a changeable direction or an unchangeable direction of the feature vectors, such as "wind" or "gravity" in the feature vector space (refer to S. S. Chern, W. H. Chen, K. S. Lam, "Lectures on Differential Geometry", 1999). Accordingly, by using the quasi metric as the dissimilarity of feature vectors, it is possible to calculate the dissimilarity of feature vectors in consideration of a changeable direction or an unchangeable direction. As an example of a quasi-metric function, a function $d_q$ illustrated by the following expression (4) is given.

$$d_q(\vec{x}, \vec{y}) = \sqrt{((x_1-y_1)^2 + (x_2-y_2)^2 + (x_3-y_3)^2) + \omega_1 \cdot (x_1-y_1) + \omega_2 \cdot (x_2-y_2) + \omega_3 \cdot (x_3-y_3)} \quad (4)$$

Figures 5, 6:
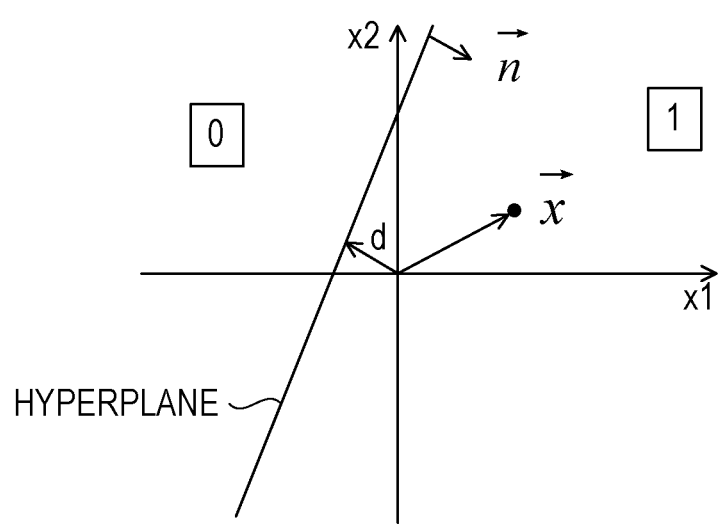
FIG. 5 is a diagram illustrating an example of a storage format of a numeric parameter of a quasi metric function.
FIG. 6 is a diagram for explaining an example of a normal hyperplane.

In expression (4), $\omega_1$, $\omega_2$, and $\omega_3$ are numeric parameters. The quasi metric function $d_q$ is defined as a function object having the parameters inside in the program. In the database, as illustrated in FIG. 5 as an example, numeric parameters are stored for each identifier of the quasi metric function $d_q$.

Next, a description will be given of the conversion of a feature vector to a binary string using a hyperplane. A feature vector is represented as a floating point fixed-length string, and the length of the string becomes the number of dimensions. When the feature vector is expressed as x[v], assuming that the normal vector of the hyperplane is n[v] and the offset is d, the equation of the hyperplane is expressed by the following expression (5).

$$\vec{x} \cdot \vec{n} + d = 0 \quad (5)$$

Dividing the feature vector space using this hyperplane and giving a binary value to each feature vector x[v] that is existent in the feature vector space is equivalent to the calculation of the following expression (6).

$$b(\vec{x}) = \begin{cases} 1 & \text{if } \vec{x} \cdot \vec{n} + d > 0 \\ 0 & \text{otherwise} \end{cases} \quad (6)$$

Giving a binary value to a feature vector x[v] using the above-described expression (6) is geometrically illustrated as an example in FIG. 6. In this regard, FIG. 6 illustrates the case where "1" is given to the feature vector x[v].

For example, assuming that there are B hyperplanes, and 0 or 1 is given to the feature vector x[v] using each hyperplane, it is possible to create a binary string having a length of B for the feature vector x[v]. Hereinafter the generated binary string is expressed as b[v]. When the i-th bit of a binary string b[v] (x[v]) is expressed as b[v] (x[v])$_i$, the binary string b[v] (x[v]) is expressed by the following expression (7).

$$\vec{b}(\vec{x}) = (\vec{b}(\vec{x})_1, \vec{b}(\vec{x})_2, \ldots, \vec{b}(\vec{x})_B) \quad (7)$$

Assuming that the normal vector of the i-th hyperplane is $n^{(i)}[v]$ and the offset is $d^{(i)}$, the i-th bit b[v] (x[v])$_i$ is obtained by the following expression (8).

$$\vec{b}(\vec{x})_i = \begin{cases} 1 & \text{if } \vec{x} \cdot \vec{n}^{(i)} + d^{(i)} > 0 \\ 0 & \text{otherwise} \end{cases} \quad (8)$$

Hereinafter b[v] is referred to as a conversion function to a binary string using a hyperplane. In the program, a hyperplane ought to be given numeric values corresponding to a "normal vector" and an "offset" respectively. Accordingly, for hyperplane data that represents a hyperplane, an identifier that identifies a hyperplane, a normal vector, and an offset are stored for each hyperplane as illustrated as an example in FIG. 7.

In this regard, hereinafter a combination of a "normal vector" and an "offset" is referred to as a "normal vector" in order to avoid complexity. Also, hereinafter a hyperplane described above is referred to as a "normal hyperplane" in order to distinguish from a one-way hyperplane described later.

Next, a description will be given of the Hamming distance between binary strings. The Hamming distance Hamm between two binary strings $c_1[v]$ and $c_2[v]$ is obtained by the number of 1 in the result of the exclusive OR operation of the corresponding bits in the binary strings, and is obtained by the following expression (9). In expression (9), popc is a population count function that counts the number of 1 in a binary string.

$$\text{Hamm}(\vec{c_1},\vec{c_2}):=\text{popc}(\vec{c_1}\oplus\vec{c_2}) \tag{9}$$

Figures 7, 8, 9:
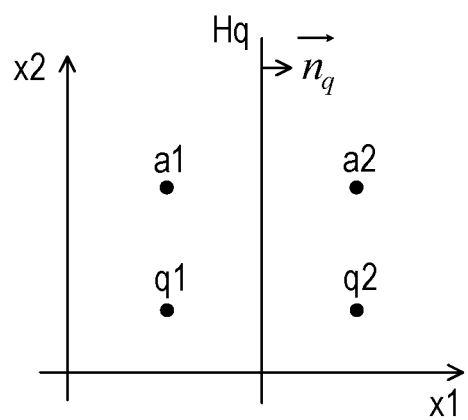
FIG. 7 is a diagram illustrating an example of a storage format of normal hyperplane data.
FIG. 8 is a diagram for explaining a calculation method of a Hamming distance.
FIG. 9 is a diagram for explaining an example of a one-way hyperplane.

For example, the Hamming distance between binary strings "00111011" and "01101110" becomes "4" as illustrated in FIG. 8. The dissimilarity Sim between feature vectors x[v] and y[v] is expressed by the following expression (10) using the conversion function b[v] and the Hamming distance Hamm.

$$\text{Sim}(\vec{x},\vec{y}):=\text{Hamm}(\vec{b}(\vec{x}),\vec{b}(\vec{y})). \tag{10}$$

Next, a description will be given of one-way hyperplane used in the present embodiment. A one-way hyperplane is a hyperplane in which when a feature vector space is divided by the one-way hyperplane, the distance between one of the divided areas and the other of the areas has asymmetry. In this regard, the asymmetry of a distance mentioned here means that the distance when one of the areas is set to a start point and the other of the areas is set to be an end point has a different property from the distance when the other of the areas is set to the start point and the one of the areas is set to the end point. Also, the symmetry of a distance means that the distance when one of the areas is set to a start point and the other of the areas is set to be an end point has the same property from the distance when the other of the areas is set to the start point and the one of the areas is set to the end point. In the following, a detailed description will be given of a one-way hyperplane. The equation of a one-way hyperplane is expressed by the following expression (11) using the normal vector $n_q[v]$ and the offset $d_q$.

$$\vec{x}\cdot\vec{n_q}+d_q=0. \tag{11}$$

Also, the conversion function $b_q[v]$ to a binary string using a one-way hyperplane is expressed by the following expression (12).

$$\vec{b_q}(\vec{x})_i = \begin{cases} 1 & \text{if } \vec{x}\cdot\vec{n_q^{(i)}}+d_q^{(i)} > 0 \\ 0 & \text{otherwise} \end{cases} \tag{12}$$

As illustrated in FIG. 9 as an example, a description will be given of feature vectors a1, a2, q1, and q2 that are existent in the two areas divided by a one-way hyperplane $H_q$.

Figures 10, 11, 12:
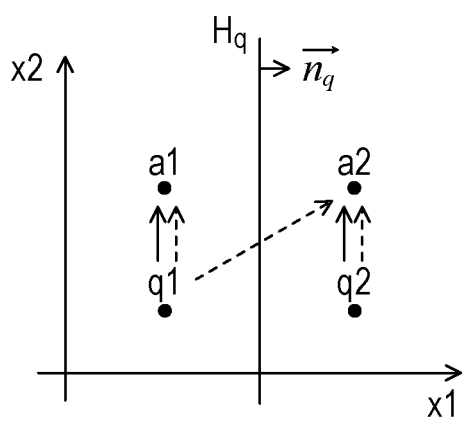
FIG. 10 is a diagram illustrating an example of an input and output relationship of a conversion function of a binary string.
FIG. 11 is a diagram illustrating an example of the asymmetric distance when x and y are assumed to be inputs.
FIG. 12 is a diagram for explaining the difference between a normal hyperplane and a one-way hyperplane.

The output of the conversion function $b_q[v]$ when each of the feature vectors a1, a2, q1, are q2 is input becomes as illustrated in FIG. 10.

Also, as illustrated in FIG. 11, $b_q[v](x[v])\cdot\text{NOT}(b_q[v](y[v]))$ is calculated for each of the feature vectors a1, a2, q1, and q2. As illustrated in FIG. 11, when $b_q[v](x[v])\cdot\text{NOT}(b_q[v](y[v]))$ is used as the dissimilarity between the feature vectors, the distances from q1 to a1 and a2 become 0. Also, in this case, the distance from q2 to a2 becomes 0, and the distance from q2 to a1 becomes 1. That is to say, passing from the left area to the right area of the one-way hyperplane $H_q$ illustrated in FIG. 9 takes no cost, but passing from the right area to the left area takes a cost.

As illustrated in FIG. 12, by the above-described Hamming distance, it is only possible to reach from q1 and q2 to the destination illustrated by a solid arrow at a distance of 0. In contrast, it becomes possible to reach from q1 and q2 to the destination illustrated by a dashed arrow using $b_q[v](x[v])\cdot\text{NOT}(b_q[v](y[v]))$ at a distance of 0. In this manner, a one-way hyperplane behaves just like a one-way movement.

For example, it is assumed that there are $B_q$ one-way hyperplanes. By giving 0 or 1 to a feature vector x[v] using each of the one-way hyperplanes, it is possible to generate binary strings having a length of $B_q$ for the feature vector x[v].

Figures 13, 14, 15:
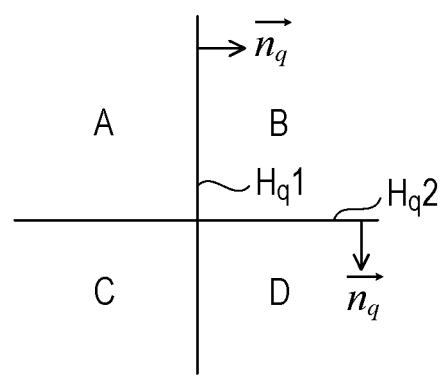
FIG. 13 is a diagram for explaining a calculation method of an asymmetric Hamming distance.
FIG. 14 is a diagram for explaining a calculation method of an asymmetric Hamming distance.
FIG. 15 is a diagram illustrating a state in which a feature vector space is divided by two one-way hyperplanes.

For example, it is thought that there is a case where the binary string $b_q[v](q[v])$ produced by converting the feature vector q[v] of query data is "00111011", and the binary string $b_q[v](q[v])$ produced by converting the feature vector q[v] of record data is "01101100". In this case, the asymmetric component of the dissimilarity becomes "3" as illustrated in FIG. 13.

On the contrary, it is thought that there is a case where the binary string $b_q[v](q[v])$ produced by converting the feature vector q[v] of query data is "01101100", and the binary string $b_q[v](q[v])$ produced by converting the feature vector q[v] of record data is "00111011". In this case, the asymmetric component of the dissimilarity becomes "2" as illustrated in FIG. 14.

Assuming that the above-described dissimilarity is an asymmetric Hamming distance QHamm, the asymmetric Hamming distance QHamm between the two binary strings $c_1[v]$ and $c_2[v]$ is defined by the following expression (13). The bar above $c_2[v]$ denotes NOT described above.

$$Q\text{Hamm}(\vec{c_1},\vec{c_2}):=\text{popc}(\vec{c_1}\overline{\vec{c_2}}) \tag{13}$$

As an example, as illustrated in FIG. 15, a description will be given of the distance between each area when a feature vector space is divided into four areas A, B, C, and D using two one-way hyperplanes $H_q1$ and $H_q2$. The distance between one of the areas divided by each of the one-way hyperplanes $H_q1$ and $H_q2$, and the other of the areas differs when viewed in the direction of each normal vector $n_q[v]$ and when viewed in the opposite direction.

For example, the distance between the two points when any point in area A is set to a start point, and any point in area B is set to an end point is "0". The distance between the two points when any point in area A is set to a start point and any point in area C is set to an end point is also "0". The distance between the two points when any point in area A is set to a start point and any point in area D is set to an end point is also "0".

Figures 16, 17, 18:
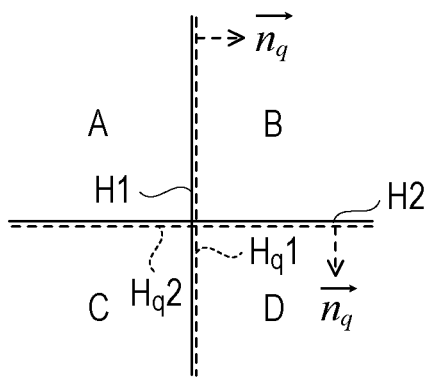
FIG. 16 is a diagram illustrating the distance between each area when a feature vector space is divided by two one-way hyperplanes.
FIG. 17 is a diagram illustrating a state in which a feature vector space is divided by two normal hyperplanes and two one-way hyperplanes.
FIG. 18 is a diagram illustrating the distance between each area when a feature vector space is divided by two normal hyperplanes and two one-way hyperplanes.

In contrast, for example, the distance between the two points when any point in area D is set to a start point and any point in area A is set to an end point is "2". Also, the distance between the two points when any point in area D is set to a start point and any point in area D is set to an end point is "1". Also, the distance between the two points when any point in area D is set to a start point and any point in area C is set to an end point is "1". Accordingly, the distance between any two points in each area becomes as illustrated in FIG. 16. For example, the first row in FIG. 16 illustrates the distance between the two points when any point in the area A is set to a start point, and any point in each area from area A to area D is set to an end point.

Here, the fact that the distance between the two points when any point in area A is set to a start point and any point in area D is set to an end point is "0" significantly breaks the positive definiteness of quasi metric, in which if the distance between the two points is "0", the two points take the same position. Thereby, when the quasi metric approximated using only a one-way hyperplane as the dissimilarity between feature vectors is used, the determination precision of the similarity greatly deteriorates.

Thus, in the present embodiment, a normal hyperplane and a one-way hyperplane are correspondingly disposed, an asymmetric component of the dissimilarity is calculated using the one-way hyperplane, and a symmetric components of the dissimilarity is calculated using the normal hyperplane so that the quasi metric is approximated. As an example, FIG. 17 illustrates an example in which normal hyperplanes H1 and H2, and one-way hyperplanes $H_q1$ and $H_q2$ are disposed correspondingly such that they overlap at the same position. In this regard, in FIG. 17, for the sake of convenience of illustration, the position of normal hyperplanes H1 and H2 and the position of one-way hyperplanes $H_q1$ and $H_q2$ are illustrated by being slightly shifted.

In the example in FIG. 17, the distance between the two points when any point in area A is set to a start point and any point in area D is set to an end point becomes the sum of "2", which is the distance in the case of passing through the normal hyperplane, and "0", which is the distance in the case of passing through the one-way hyperplane. Accordingly, the distance between any two points in each area becomes as illustrated in FIG. 18. As illustrated in FIG. 18, using the normal hyperplanes H1 and H2, and the one-way hyperplanes $H_q1$ and $H_q2$, the positive definiteness of quasi metric is maintained compared with the case of using only the one-way hyperplanes $H_q1$ and $H_q2$. Thereby, deterioration of the determination precision of the similarity is reduced.

In this regard, a one-way hyperplane is disposed correspondingly to a normal hyperplane, but a normal hyperplane may not be disposed correspondingly to a one-way hyperplane. Also, a plurality of one-way hyperplanes and normal hyperplanes may be disposed at one position, the number of one-way hyperplanes and the number of normal hyperplanes that have the same position may not be the same.

Figure 19:
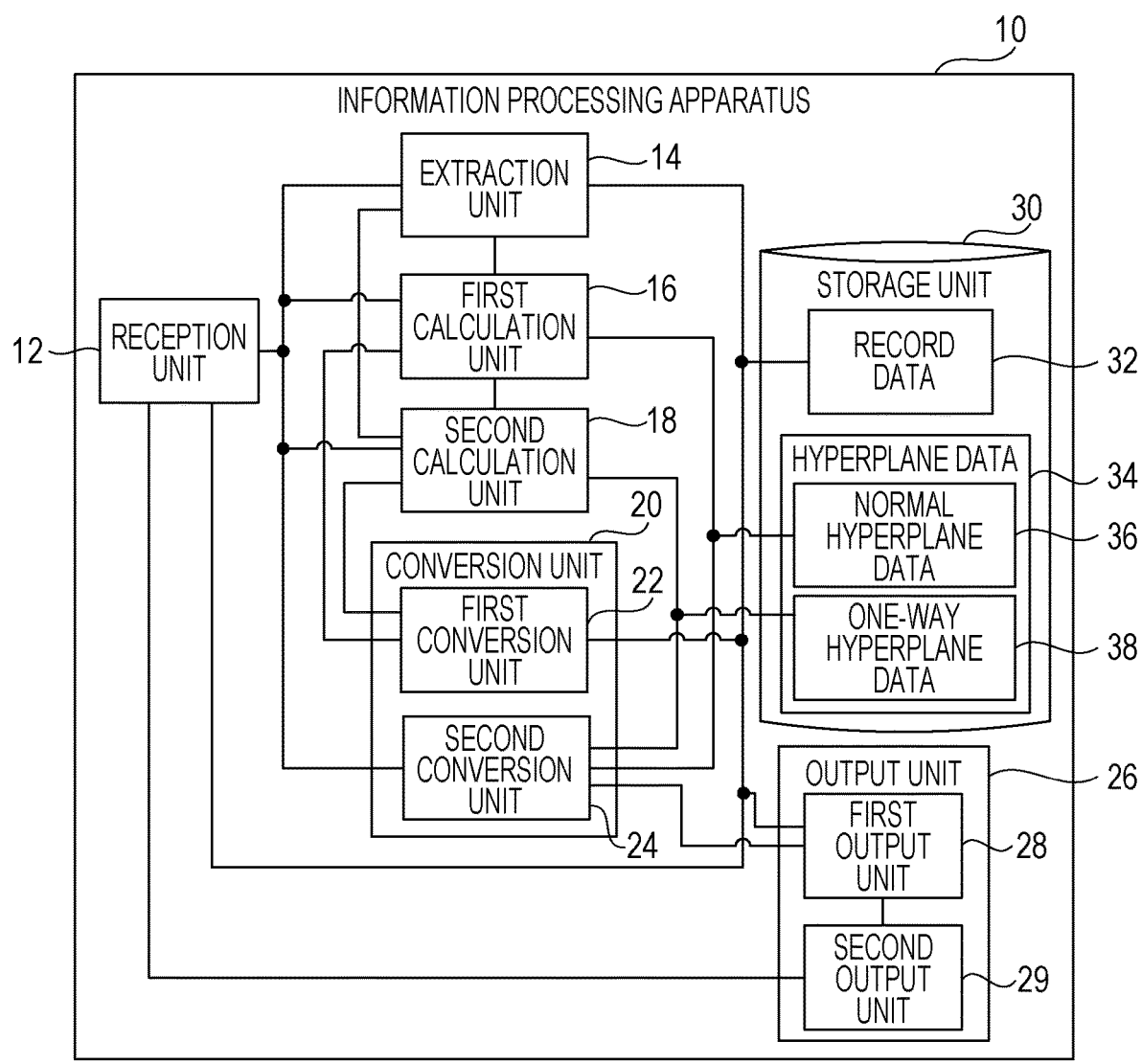
FIG. 19 is a functional block diagram of an information processing apparatus according to an embodiment.

Next, a description will be given of the configuration of the information processing apparatus 10 according to the present embodiment with reference to FIG. 19. As illustrated in FIG. 19, the information processing apparatus 10 includes a reception unit 12, an extraction unit 14, a first calculation unit 16, a second calculation unit 18, a conversion unit 20, an output unit 26, and a storage unit 30. The conversion unit 20 includes a first conversion unit 22 and a second conversion unit 24. The output unit 26 includes a first output unit 28 and a second output unit 29. The storage unit 30 stores record data 32 and hyperplane data 34. The hyperplane data 34 includes normal hyperplane data 36 and one-way hyperplane data 38.

The reception unit 12 receives a registration instruction of a fingerprint and the image data obtained by capturing the image of the fingerprint to be registered. The reception unit 12 calculates a feature vector from the received image data, and stores the calculated feature vector and the data identifier that uniquely identifies the feature vector into the record data 32 in the storage unit 30. In the present embodiment, the reception unit 12 performs Fourier transform and polar coordinate conversion on the image data as an example, and calculates a three-dimensional feature vector. In this regard, for a calculation method of a feature vector, a publicly known method ought to be used, and thus a detailed description will be omitted here. Also, the number of dimensions of a feature vector is not limited to three, and may be two or four.

The record data 32 includes storage areas of a data identifier, a feature vector, a binary string b, and a binary string $b_q$ as an example illustrated in FIG. 26. In this regard, a described later of the binary string b and the binary string $b_q$.

Also, the reception unit 12 receives a learning instruction and outputs the learning instruction to the extraction unit 14. Also, the reception unit 12 receives a matching instruction and receives the image data obtained by capturing the image of a fingerprint to be matched as query data. The reception unit 12 calculates a feature vector from the received image data, outputs the calculated feature vector to the second conversion unit 24 and the second output unit 29, and outputs a matching instruction to the extraction unit 14. Also, the reception unit 12 receives four integer parameters NL, Nq, B, and Bq, outputs NL and Nq to the extraction unit 14, outputs B to the first calculation unit 16, and outputs Bq to the second calculation unit 18.

When the learning instruction is input from the reception unit 12, the extraction unit 14 extracts a predetermined number of record data (hereinafter referred to as "first learning data") from the record data 32 as the learning data of a normal hyperplane, and outputs the extracted first learning data to the first calculation unit 16. In the present embodiment, the extraction unit 14 extracts NL first learning data that was input from the reception unit 12 from the record data 32.

Further, the extraction unit 14 also extracts a predetermined number of record data (hereinafter referred to as "second learning data") from the record data 32 as the learning data of a one-way hyperplane, and outputs the extracted second learning data to the second calculation unit 18. In the present embodiment, the extraction unit 14 extracts Nq second learning data that was input from the reception unit 12 from the record data 32.

Also, when the matching instruction is input from the reception unit 12, the extraction unit 14 extracts a plurality of record data (hereinafter referred to as "matching data") to be used for determining the similarity with the query data from the record data 32, and outputs the extracted matching data to the first output unit 28.

The first calculation unit 16 calculates normal hyperplane data representing a normal hyperplane, which is a hyperplane that divides a feature vector space and in which the distance between a pair of divided areas has symmetry, using the first learning data input from the extraction unit 14. In the present embodiment, the first calculation unit 16 learns the position of a normal hyperplane using the first learning data and calculates the normal hyperplane data representing the normal hyperplane by the method described in B. Kulis and T. Darrell, "Learning to Hash with Binary Reconstructive Embeddings", in NIPS 22, 2009, M. Norouzi, D. J. Fleet, and R. Salakhutdinov, "Hamming distance Metric Learning", in NIPS 25, 2012, or the like, for example. In this regard, in the present embodiment, the first calculation unit 16 calculates B normal hyperplane data that was input from the reception unit 12.

Figures 22, 23:
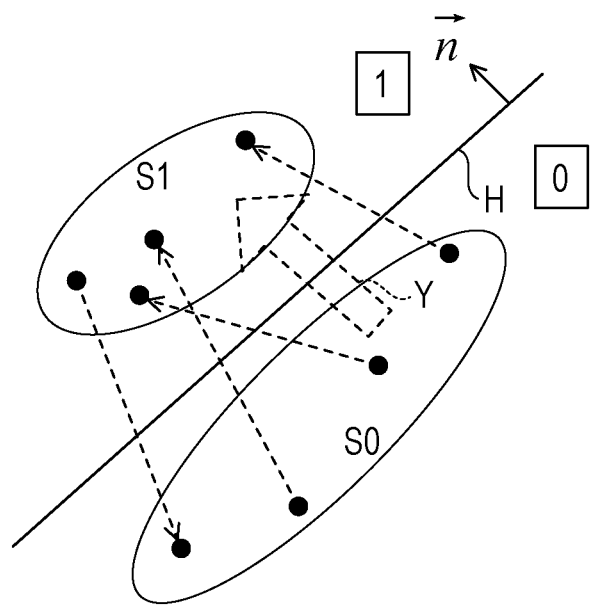
FIG. 22 is a diagram illustrating an example of hyperplane data.
FIG. 23 is a diagram for explaining calculation processing of one-way hyperplane data.

The first calculation unit 16 stores the calculated normal hyperplane data into the normal hyperplane data 36 in the storage unit 30. At this time, the first calculation unit 16 also stores a hyperplane identifier that uniquely identifies a hyperplane and the type of the hyperplane into the normal hyperplane data 36 in the storage unit 30. Further, the first calculation unit 16 outputs the calculated normal hyperplane data to the second calculation unit 18 and the first conversion unit 22. The hyperplane data 34 including the normal hyperplane data 36 includes storage areas of a hyperplane identifier, a type, a normal vector, and an offset as an example as illustrated in FIG. 22. In this regard, a record having the type of "N" indicates a normal hyperplane, and a record having the type of "Q" indicates a one-way hyperplane.

The second calculation unit 18 calculates one-way hyperplane data using the second learning data and the normal hyperplane data that was input from the first calculation unit 16. The one-way hyperplane data is the data representing the one-way hyperplane which divides a feature vector space, and in which the distance between a pair of the divided areas has asymmetry. In the present embodiment, the second calculation unit 18 calculates the one-way hyperplane data such that the one-way hyperplane overlaps the normal hyperplane representing the normal hyperplane data in the feature vector space (that is to say, so as to position at the same position). In this regard, the fact that the normal hyperplane and the one-way hyperplane overlap in the feature vector space means that the normal vector and the offset of the normal hyperplane matches the normal vector and the offset of the one-way hyperplane. Alternatively, the fact that the normal hyperplane overlaps the one-way hyperplane in the feature vector space means that the arrangement of each element of the normal vector and the offset of the normal hyperplane matches the arrangement of each element of the normal vector and the offset of the one-way hyperplane with the exception that they have the opposite signs.

Also, in the present embodiment, when a feature vector space is divided into a pair of areas by the normal hyperplane represented by the normal hyperplane data, the second calculation unit 18 calculates the asymmetric component of the quasi metric in a feature vector space of a pair of record data 32 that are positioned in different areas. The asymmetric component of the quasi metric is integrated for each of a plurality of combinations of a pair of record data 32 for individual normal hyperplanes. Next, a determination is made of the number of one-way hyperplanes and individual directions based on the integrated value of the asymmetric components of the quasi metric corresponding to the individual normal hyperplanes.

Specifically, the second calculation unit 18 determines the number of one-way hyperplanes using the parliamentary seat decision method of the party-list proportional representation system. In particular, in the present embodiment, the second calculation unit 18 determines the number of one-way hyperplanes using the d'Hondt method as the parliamentary seat decision method of the party-list proportional representation system.

When the second calculation unit 18 uses the above-described parliamentary seat decision method, the second calculation unit 18 performs the following processing for each normal hyperplane representing the normal hyperplane data calculated by the first calculation unit 16. The second calculation unit 18 calculates the asymmetric component of the quasi metric for each pair of combinations of the feature vectors of the record data 32 that are existent in one of the areas and the feature vectors of the record data 32 that are existent in the other of the areas when a feature vector space is divided by a normal hyperplane. Also, the second calculation unit 18 assigns a parliamentary seat to each normal hyperplane using the absolute value of the sum of the asymmetric components of the calculated quasi metric as the number of votes obtained for the normal hyperplane. The second calculation unit 18 then determines the number of assigned seats to be the number of one-way hyperplanes corresponding to the normal hyperplanes. In this regard, in the present embodiment, the second calculation unit 16 calculates one-way hyperplane data using Bq, which was input from the input reception unit 12.

The second calculation unit 18 then stores the calculated one-way hyperplane data in the one-way hyperplane data 38 in the storage unit 30 (also refer to FIG. 22). At this time, the second calculation unit 18 stores the hyperplane identifier and the type of the hyperplane in the one-way hyperplane data 38 in the storage unit 30 (also refer to FIG. 22). Further, the second calculation unit 18 outputs the calculated one-way hyperplane data to the first conversion unit 22.

When the first conversion unit 22 receives input of the normal hyperplane data from the first calculation unit 16 and input of the one-way hyperplane data of the second calculation unit 18, the first conversion unit 22 extracts a plurality of record data from the record data 32. The first conversion unit 22 converts the feature vector stored in each of the record data using the input normal hyperplane data to a first binary string b. The first conversion unit 22 then stores the converted binary string b to the binary string b of each of the record data in the record data 32 (also refer to FIG. 26).

Also, the first conversion unit 22 converts the feature vector stored in each of the record data to a second binary string $b_q$ using the input one-way hyperplane data. The first conversion unit 22 then stores the converted binary string $b_q$ to a binary string $b_q$ of each of the record data in the record data 32 (also refer to FIG. 26).

When the second conversion unit 24 receives input of the feature vector corresponding to the query data from the reception unit 12, the second conversion unit 24 obtains normal hyperplane data from the normal hyperplane data 36 and one-way hyperplane data from the one-way hyperplane data 38. The second conversion unit 24 converts the feature vector to a first binary string b using the normal hyperplane data in the same manner as the first conversion unit 22. Also, the second conversion unit 24 converts the feature vector to a second binary string $b_q$ using the one-way hyperplane data in the same manner as the first conversion unit 22. The second conversion unit 24 then outputs the converted binary string b and binary string $b_q$ to the first output unit 28.

When the first output unit 28 receives matching data from the extraction unit 14 and the binary string b and the binary string $b_q$ from the second conversion unit 24, the first output unit 28 performs the following processing. The first output unit 28 calculates the dissimilarity between the binary string b input from the second conversion unit 24 and the binary string b stored in each record data of the matching data. Also, the first output unit 28 calculates the dissimilarity between the binary string $b_q$ input from the second conversion unit 24 and the binary string $b_q$ stored in each record data of the matching data. The first output unit 28 then outputs a predetermined number of record data to the second output unit 29 in ascending order of the sum of the two calculated dissimilarities.

When the second output unit 29 receives the feature vector corresponding to the query data from the reception unit 12 and a predetermined number of record data from the first output unit 28, the second output unit 29 performs the following processing. The second output unit 29 calculates the similarity between the input feature vector and the feature vector stored in each record data. If the maximum value of the calculated similarities is equal to or higher than a predetermined value, the second output unit 29 outputs the information indicating that the result of fingerprint matching was normal. Also, if the maximum value of the calculated similarities is less than the predetermined value, the second output unit 29 outputs the information indicating that the result of fingerprint matching was abnormal. In this regard, the processing for calculating the similarity between the input feature vector and the feature vector stored in each record data ought to be performed by using a well-known method, and thus a detailed description thereof will be omitted here.

Figure 20:
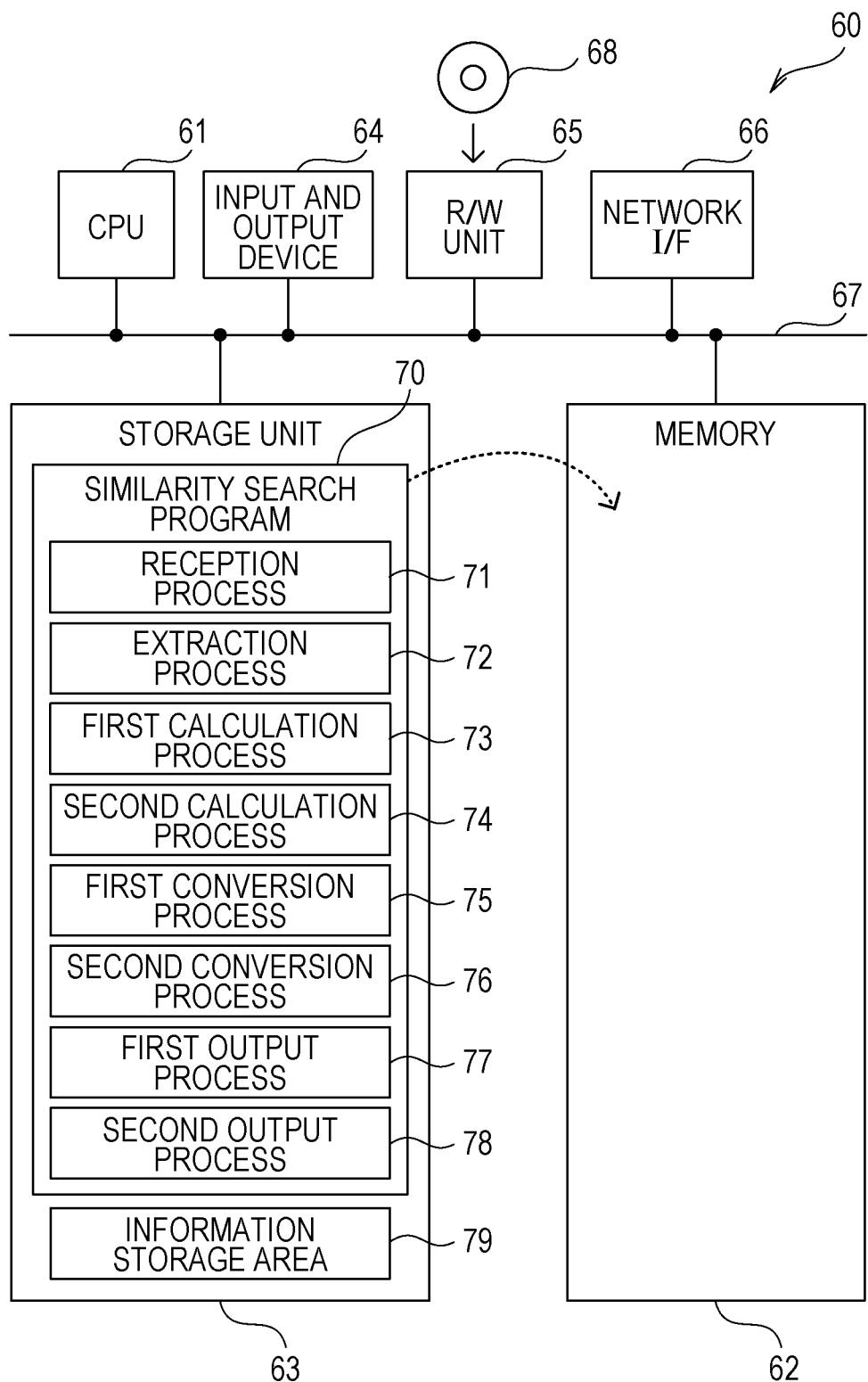
FIG. 20 is a block diagram illustrating a schematic configuration of a computer that functions as an information processing apparatus according to the embodiment.

It is possible to realize the information processing apparatus 10, for example, by a computer 60 illustrated in FIG. 20. The computer 60 includes a central processing unit (CPU) 61, a memory 62 as a temporary storage area, and a nonvolatile storage unit 63. Also, the computer 60 includes a first input unit on which a fingerprint is pressed, and which captures the image of the pressed fingerprint to receive input of the image data, the second input unit that receives input of various instructions by a user, and an input and output device 64 that includes a display unit, or the like. Also, the computer 60 includes a R/W unit 65 that controls reading data from and writing data to the recording medium 68, and a network I/F 66 coupled to a network. The CPU 61, the memory 62, the storage unit 63, the input and output device 64, the R/W unit 65, and the network I/F 66 are mutually coupled via a bus 67.

It is possible to realize the storage unit 63 by a hard disk drive (HDD), a solid state drive (SSD), a flash memory, or the like. The storage unit 63, as a storage medium, stores a similarity search program 70 for functioning the computer 60 as the information processing apparatus 10. The similarity search program 70 includes a reception process 71, an extraction process 72, a first calculation process 73, a second calculation process 74, a first conversion process 75, a second conversion process 76, a first output process 77, and a second output process 78. Also, the storage unit 63 includes an information storage area 79 that functions as the storage unit 30.

The CPU 61 reads the similarity search program 70 from the storage unit 63, loads the program into the memory 62, and executes the processes of the similarity search program 70. The CPU 61 executes the reception process 71 so as to operate the reception unit 12 illustrated in FIG. 19. The CPU 61 executes the extraction process 72 so as to operate the extraction unit 14 illustrated in FIG. 19. The CPU 61 executes the first calculation process 73 so as to operate as the first calculation unit 16 illustrated in FIG. 19. The CPU 61 executes the second calculation process 74 so as to operate as the second calculation unit 18 illustrated in FIG. 19. The CPU 61 executes the first conversion process 75 so as to operate as the first conversion unit 22 illustrated in FIG. 19. The CPU 61 executes the second conversion process 76 so as to operate as the second conversion unit 24 illustrated in FIG. 19. The CPU 61 executes the first output process 77 so as to operate the first output unit 28 illustrated in FIG. 19. The CPU 61 executes the second output process 78 so as to operate as the second output unit 29 illustrated in FIG. 19.

Thereby, the computer 60 that has executed the similarity search program 70 functions as the information processing apparatus 10.

Also, it is also possible to realize the functions realized by the similarity search program 70, for example by a semiconductor integrated circuit, more specifically an application specific integrated circuit (ASIC), or the like.

Figure 21:
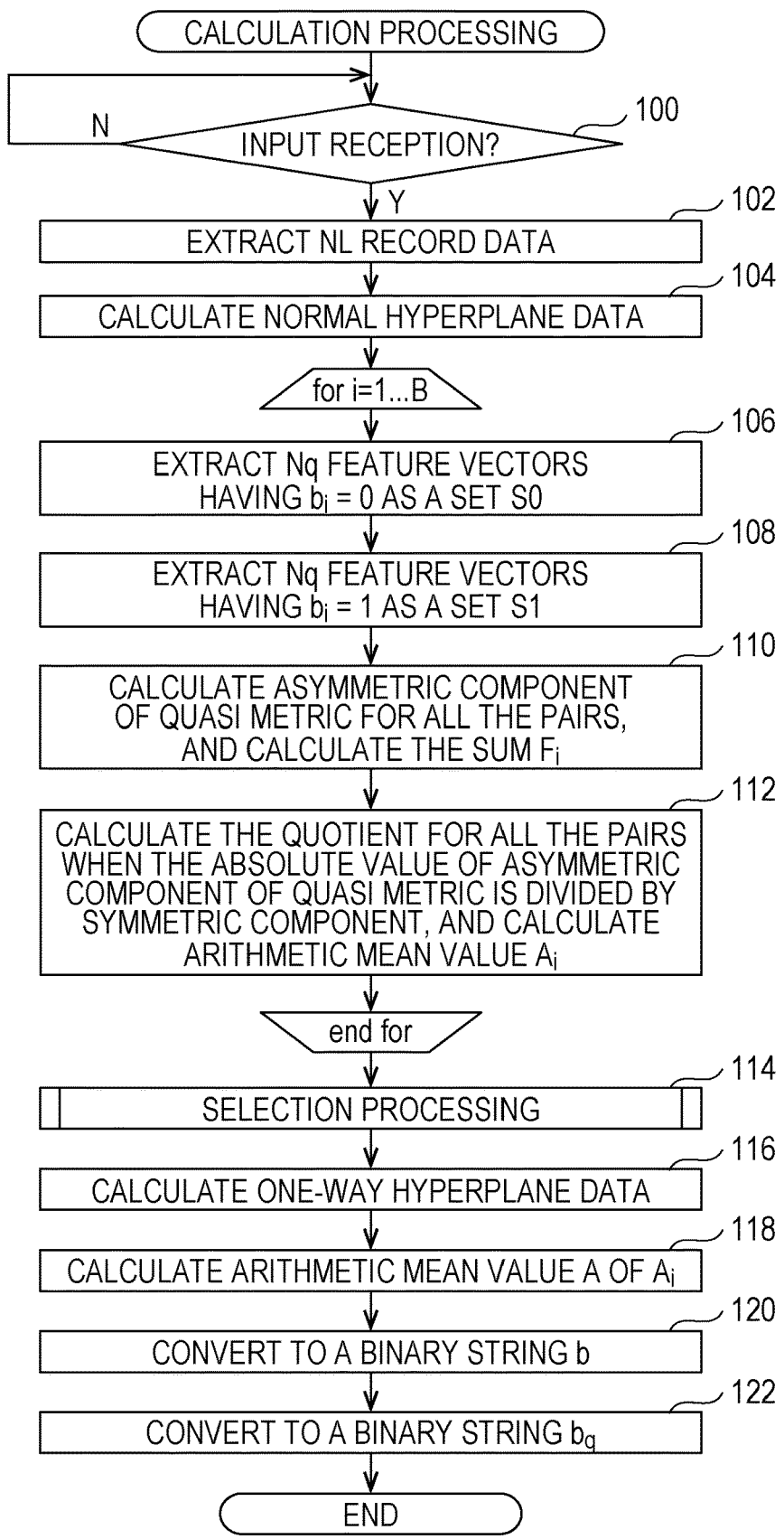
FIG. 21 is a flowchart illustrating an example of calculation processing according to the embodiment.
Figure 27:
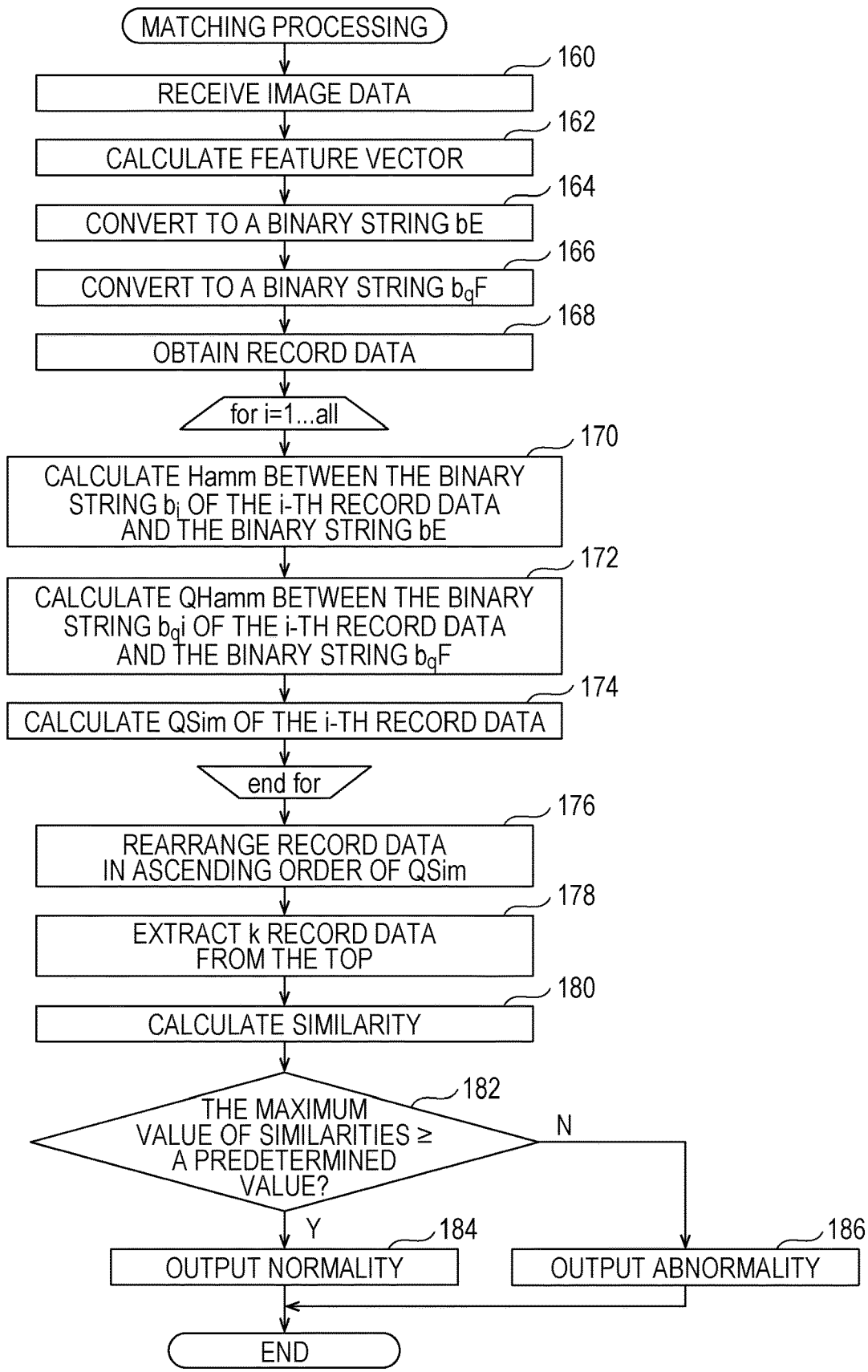
FIG. 27 is a flowchart illustrating an example of matching processing according to the embodiment.

Next, a description will be given of operation of the information processing apparatus 10 according to the present embodiment. The processing apparatus 10 executes the similarity search program 70 so that calculation processing illustrated in FIG. 21 and the matching processing illustrated in FIG. 27 are performed. In this regard, in the present embodiment, a description will be given on the assumption that the reception unit 12 has received a registration instruction, the feature vector has been stored, a predetermined number of record data in which binary string b and binary string $b_q$ have not been stored is stored in the record data 32. Also, the execution of the calculation processing illustrated in FIG. 21 is started when a user of the information processing apparatus 10 inputs an instruction of execution start via the second input unit of the input and output device 64, or the like. Also, the execution of the matching processing illustrated in FIG. 27 is started when the image data obtained by capturing the image of a fingerprint to be matched is input via the first input unit of the input and output device 64, or the like.

In step 100 of the calculation processing illustrated in FIG. 21, the reception unit 12 waits for receiving four numeric parameters NL, Nq, B, and Bq. When the reception unit 12 receives the numeric parameters NL, Nq, B, and Bq, step 100 becomes affirmative determination, and the processing proceeds to step 102. In step 102, the extraction unit 14 extracts NL record data from the record data 32 as first learning data. In this regard, if a numeric parameter NL is not specified, the extraction unit 14 may obtain all the record data 32 as the first learning data. Also, in this case, the extraction unit 14 may extract all the record data in which the binary string b and the binary string $b_q$ are not stored among the record data 32 as first learning data.

In step 104, the first calculation unit 16 calculates B normal hyperplane data using the first learning data extracted in step 102, and stores the calculated B normal hyperplane data in the normal hyperplane data 36 in the storage unit 30. As illustrated in FIG. 22 as an example, the normal hyperplane data 36 is stored in the processing of step 104.

The processing from step 106 to step 112 is repeatedly performed for each of the hyperplane data calculated in step 104 while incrementing a variable i from 1 to B by adding 1 every time the processing is performed on one hyperplane data. In step 106, the extraction unit 14 extracts Nq feature vectors having $b[v](x[v])_i$ of 0 in accordance with the expression (8) from the record data 32, and determines the feature vectors to be a set S0.

In step 108, the extraction unit 14 extracts Nq feature vectors having $b[v](x[v])_i$ of 1 in accordance with the expression (8) from the record data 32, and determines the feature vectors to be a set S1. In step 110, the second calculation unit 18 calculates an asymmetric component of the quasi metric in accordance with the expression (3) for each combination pair of the elements of the set S0 extracted in step 106 and the elements of the set S1 extracted in step 108. Then second calculation unit 18 calculates the sum $F_i$ of the calculated asymmetric components.

In step 112, the second calculation unit 18 calculates a symmetric component of the quasi metric in accordance with the expression (2) for all the pairs of the combination. Also, the second calculation unit 18 calculates the quotient when the absolute value of the asymmetric component calculated in step 110 is divided by the calculated symmetric component for each of all the pair combinations, and calculates the arithmetic mean $A_i$ of the calculated values. As illustrated by the arrow Y in FIG. 23 as an example, the arithmetic mean $A_i$ calculated in step 112 becomes a value indicating the intensity of the asymmetric component of the quasi metric between the two areas divided by a normal hyperplane H. Also, the direction of the arrow Y in FIG. 23 corresponds to the direction in which the feature vector is easily moved.

Figure 24:
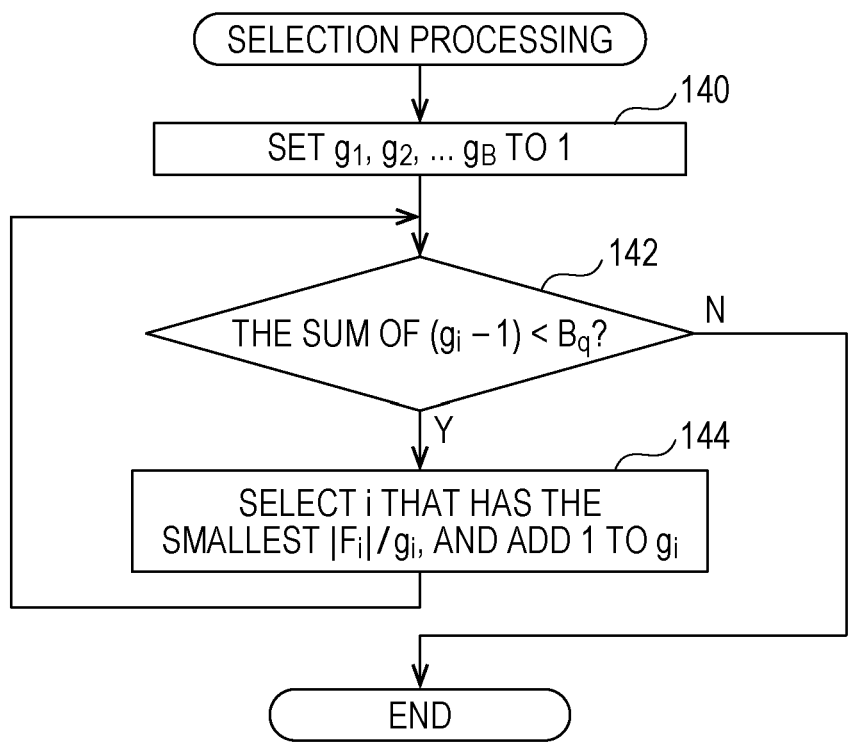
FIG. 24 is a flowchart illustrating an example of selection processing according to the embodiment.

In step 114, the selection processing illustrated in FIG. 24 is performed. FIG. 24 is a flowchart of a specific example of the processing of the d'Hondt method. In step 140 of the selection processing illustrated in FIG. 24, the second calculation unit 18 sets the variable $g_i$ (i=1 to B) to 1. In step 142, the second calculation unit 18 determines whether or not the sum of the difference $g_i$ minus 1, namely $g_i-1$ (i=1 to B), is less than Bq received in step 100. If the determination is affirmative, the processing proceeds to step 144.

In step 144, the second calculation unit 18 selects $g_i$ having the smallest $|F_i|/g_i$, which is produced by the absolute value of the sum calculated in step 110 $|F_i|$ being divided by $g_i$, adds 1 to the selected $g_i$, and the processing returns to step 142. On the other hand, if the determination in step 142 is negative, the selection processing is terminated, and the processing returns to step 116 in FIG. 21.

In step 116, the second calculation unit 18 calculates the data produced by copying in step 114 the i-th normal hyperplane data of $g_i$ pieces calculated in step 104 as a one-way hyperplane data. At this time, if the sum $F_i$ calculated in step 110 is a negative value, the second calculation unit 18 inverts the normal vector of the copied data. Then second calculation unit 18 stores the calculated one-way hyperplane data into the one-way hyperplane data 38 in the storage unit 30 (also refer to FIG. 22).

FIG. 22 illustrates an example in which one normal hyperplane data having the hyperplane identifier of 001 is copied to produce one-way hyperplane data having the hyperplane identifier of 003. FIG. 22 also illustrates an example in which one normal hyperplane data having the hyperplane identifier of 002 is copied and the normal vector thereof is inverted to produce one-way hyperplane data having the hyperplane identifier of 004. In this regard, the storage formats of normal hyperplane data and one-way hyperplane data are not limited to the example illustrated in FIG. 22. In the present embodiment, a normal hyperplane and a one-way hyperplane are disposed at the same position, and thus as an example illustrated in FIG. 25, the storage format in which the number of one-way hyperplanes is added to the normal hyperplane data may be employed. In FIG. 25, the one-way hyperplane having a negative number of one-way hyperplanes indicates that the direction of the normal vector is opposite to that of the normal hyperplane.

In step 118, the second calculation unit 18 calculates the arithmetic mean A of the calculated arithmetic means $A_i$ (i=1 to B) calculated in step 112. In step 120, the first conversion unit 22 extracts record data not having a stored binary string b from the record data 32. Also, the first conversion unit 22 converts the feature vector stored in the extracted record data to a binary string b in accordance with the conversion function b[v] to a binary string using the normal hyperplane data calculated in step 104 (refer to the expression (8)). The first conversion unit 22 then stores the binary string b obtained by the conversion into the binary string b in the record data 32.

In this regard, the first conversion unit 22 may converts the feature vector to a binary string b and update the binary string b in the record data 32 for the record data 32 having the binary string b that are already stored.

In step 122, the second conversion unit 24 extracts record data not having a stored binary string $b_q$ from the record data 32. Also, the second conversion unit 24 converts the feature vector stored in the extracted record data to a binary string $b_q$ in accordance with the conversion function $b_q[v]$ to a binary string using the one-way hyperplane data calculated in step 116 (refer to the expression (12)). The second conversion unit 24 then stores the binary string $b_q$ obtained by the conversion into the binary string $b_q$ of the record data 32.

In this regard, the second conversion unit 24 may converts the feature vector to a binary string $b_q$ and update the binary string $b_q$ in the record data 32 for the record data 32 having the binary string $b_q$ that are already stored.

By the processing in steps 120 and 122 described above, as an example as illustrated in FIG. 26, the binary string b and the binary string $b_q$ are calculated and stored for each record in the record data 32. In this regard, as an example, FIG. 26 illustrates the record data 32 in the case of converting the feature vector to a binary string b using four normal hyperplanes, and converting the feature vector to a binary string $b_q$ using three one-way hyperplanes. When the processing in step 122 is completed, the calculation processing is terminated.

In step 160 in FIG. 27, the reception unit 12 receives the image data obtained by capturing the image of a fingerprint to be matched. In step 162, the reception unit 12 calculates a feature vector from the image data received in step 160. In step 164, the first conversion unit 22 reads all the records of the normal hyperplane data 36 in the storage unit 30. The first conversion unit 22 then converts the feature vector calculated in step 162 to a binary string bE in accordance with the conversion function b[v] to a binary string using the normal hyperplane data that has been read (refer to the expression (8)).

In step 166, the second conversion unit 24 reads all the records of the one-way hyperplane data 38 from the storage unit 30. The second conversion unit 24 then converts the feature vector calculated in step 162 to a binary string $b_qF$ in accordance with the conversion function $b_q[v]$ to a binary string using the read one-way hyperplane data (refer to expression (12)).

In step 168, the first output unit 28 reads all the records of the record data 32 from the storage unit 30. The processing from step 170 to step 174 is repeatedly performed for each record data read in step 168 while incrementing a variable i from 1 up to the number of read records.

In step 170, the first output unit 28 calculates the Hamming distance Hamm between the binary string bi stored in the i-th record data and the binary string bE calculated in step 164 (refer to the expression (9)). In step 172, the first output unit 28 calculates the asymmetric Hamming distance QHamm between the binary string $b_qi$ stored in the i-th record data and the binary string $b_qF$ calculated in step 166 (refer to the expression (13)).

In step 174, the first output unit 28 calculates the dissimilarity QSim between the i-th record data and the query data in accordance with the following expression (14). In expression (14), Hamm(bE, bi) is the Hamming distance Hamm calculated in step 170, and QHamm ($b_qF$, $b_qi$) is the asymmetric Hamming distance QHamm calculated in step 172. Also, in the expression (14), B is the number of normal hyperplanes, and $B_q$ is the number of one-way hyperplanes. Also, in the expression (14), A is the arithmetic mean calculated in step 118 in FIG. 21.

$$QSim(bE, b_qF, bi, b_qi) = \\ Hamm(bE, bi) + \frac{B}{Bq} \times A \times (2 \times QHamm(b_qF, b_qi) - B_q) \quad (14)$$

In this regard, the calculation method of the dissimilarity QSim is not limited to expression (14). The dissimilarity QSim may be calculated using another method as long as the dissimilarity value becomes lower as the sum of the dissimilarity (Hamm) calculated from the first binary string b and the dissimilarity (QHamm) calculated from the second binary string $b_q$ becomes smaller.

In step 176, the first output unit 28 rearranges the record data obtained in step 168 in ascending order of the dissimilarity QSim calculated in step 174. In step 178, the first output unit 28 extracts a predetermined number (k pieces) of record data from the top of the record data rearranged in step 176.

In step 180, the second output unit 29 calculates the similarity between the feature vector calculated in step 162 and the feature vector stored in each record data extracted in step 176.

In step 182, the second output unit 29 determines whether or not the maximum value of the similarity calculated in step 180 is equal to or higher than a predetermined value. If the determination is affirmative, the processing proceeds to step 184, whereas if the determination is negative, the processing proceeds to step 186. In step 184, the second output unit 29 outputs the information indicating that the matching result of the fingerprint authentication is normal. In the present embodiment, the second output unit 29 displays, as an example, a screen indicating that the matching result of the fingerprint authentication is normal to the display unit of the input and output device 64. When the processing of step 184 is completed, the matching processing is terminated.

On the other hand, in step 186, the second output unit 29 outputs the information indicating that the matching result of the fingerprint authentication is abnormal. In the present embodiment, the second output unit 29 displays, as an example, a screen indicating that the matching result of the fingerprint authentication is abnormal to the display unit of the input and output device 64. When the processing in step 186 is completed, the matching processing is terminated.

As described above, in the present embodiment, the feature vectors of query data and record data are individually converted to binary strings using the normal hyperplane data and the one-way hyperplane data respectively. In this manner, the converted binary strings have the characteristics in consideration of the direction in which the feature vectors easily move. As a result, it is possible to reduce deterioration of the determination precision of the similarity between query data and record data by determining the similarity between query data and record data using the binary strings.

Also, in the present embodiment, a predetermined number of record data is output in ascending order of the dissimilarity QSim. Thereby, it is possible to reduce deterioration of the determination precision of the similarity while suppressing a decrease in the determination speed of the similarity between query data and record data.

Also, in the present embodiment, one-way hyperplane data is calculated so that the one-way hyperplane is positioned at the same position as that of the normal hyperplane. When the position of a one-way hyperplane is different from that of a normal hyperplane, a certain feature vector is sometimes positioned in different areas between the case of dividing the feature vector space by a one-way hyperplane and in the case of dividing the feature vector space by a normal hyperplane. Accordingly, with the present embodiment, compared with the case where the position of a one-way hyperplane is different from that of a normal hyperplane, it is possible to reduce deterioration of the determination precision of the similarity between query data and record data.

Also, in the present embodiment, one-way hyperplane data is calculated using the parliamentary seat decision method in the party-list proportional representation system. Thereby, compared with the case of randomly determining the number of one-way hyperplanes, it is possible to reduce deterioration of the determination precision of the similarity between query data and record data.

In this regard, in the present embodiment, a description has been given of the case where a one-way hyperplane is positioned in the same position as that of a normal hyperplane. However, the present disclosure is not limited to this. The position of a one-way hyperplane may be slightly shifted from the position of a normal hyperplane.

Also, in the present embodiment, a description has been given of the case where the d'Hondt method is used as the parliamentary seat decision method of the party-list proportional representation system. However, the present disclosure is not limited to this. For example, a method other than the d'Hondt method, such as the largest remainder method, or the like may be used as the parliamentary seat decision method of the party-list proportional representation system.

Also, in the present embodiment, a description has been given of the case where the disclosed technique is applied to fingerprint authentication. However, the present disclosure is not limited to this. The disclosed technique may be applied to matching and search of sequence data, such as deoxyribonucleic acid (DNA), or the like, images, sound, structural design parts, flow line data, or the like.

Also, in the present embodiment, a description has been given of the mode in which the similarity search program 70 is stored (installed) in the storage unit 63 in advance. However, the present disclosure is not limited to this. It is possible to provide the similarity search program 70 in the form of being recorded in a recording medium, such as a CD-ROM, a DVD-ROM, a USB memory, or the like.

It is also possible to apply the method of the disclosed technique to a space division method by a hyperplane using a kernel method.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a memory; and a processor coupled to the memory and configured to perform a process, the process including:

first calculating, based on a plurality of record data, each of the record data including a plurality of feature quantities, normal hyperplane data representing a normal hyperplane, the normal hyperplane being a hyperplane dividing a feature quantity space, and distances between the normal hyperplane and each of a pair of divided areas having symmetry, second calculating, based on the plurality of record data and the normal hyperplane data, one-way hyperplane data representing at least one one-way hyperplane which is a hyperplane such that when the feature quantity space is divided by the one-way hyperplane, distances between the one-way hyperplane and each of a pair of divided areas have asymmetry, and the one-way hyperplane data being calculated such that the one-way hyperplane overlaps the normal hyperplane represented by the normal hyperplane data in the feature quantity space, converting, based on the normal hyperplane data and the one-way hyperplane data, query data including a plurality of feature quantities and the plurality of record data into respective binary strings, the query data and the plurality of record data being respectively converted to first binary strings using the normal hyperplane data, the query data and the plurality of record data being respectively converted to second binary strings using the one-way hyperplane data, and outputting a predetermined number of record data in an order of a dissimilarity value, wherein the dissimilarity value is a sum of a dissimilarity between the first binary strinq of the query data and the first binary strinq of the record data and the dissimilarity between the second binary string of the query data and the second binary string of the record data, for each of the record data.

2. The information processing apparatus according to claim 1, wherein in the second calculating, the one-way hyperplane data is calculated such that the number and directions of the one-way hyperplanes are respectively determined based on an asymmetric component of a quasi-metric in the feature quantity space of a pair of the record data positioned in different areas which are a pair of areas in the feature quantity space divided by the normal hyperplane represented by the normal hyperplane data.

3. The information processing apparatus according to claim 2, wherein in the first calculating, normal hyperplane data representing a plurality of normal hyperplanes is calculated, and in the second calculating, when a feature quantity space is divided by the normal hyperplane represented by the normal hyperplane data into the pair of areas, integrating asymmetric components of quasi-metrics in the feature quantity space of a pair of the record data positioned in different areas for a plurality of combinations of pairs of the record data is performed individually for the respective normal hyperplanes, and based on an integrated value of the asymmetric components of the quasi-metrics corresponding to the respective normal hyperplanes, the number and directions of the one-way hyperplanes are determined.

4. The information processing apparatus according to claim 3, wherein in the second calculating, using a parliamentary seat decision method of a party-list proportional representation system, parliamentary seats are assigned to each normal hyperplane on the assumption that the absolute value of the integrated value of asymmetric components of the quasi metric is the number of votes obtained for a normal hyperplane, and a decision is made that the assigned number of seats is the number of one-way hyperplanes corresponding to the normal hyperplane.

5. The information processing apparatus according to claim 4, wherein in the second calculating, parliamentary seats are assigned to each normal hyperplane using the d'Hondt method as a parliamentary seat decision method for the party-list proportional representation system.

6. A computer-readable and non-transitory storage medium having stored a similarity search program that causes a computer to perform a process comprising:

first calculating, based on a plurality of record data, each of the record data including a plurality of feature quantities, normal hyperplane data representing a normal hyperplane, the normal hyperplane being a hyperplane dividing a feature quantity space, and distances between the normal hyperplane and each of a pair of divided areas having symmetry, second calculating, based on the plurality of record data and the normal hyperplane data, one-way hyperplane data representing at least one one-way hyperplane which is a hyperplane such that when the feature quantity space is divided by the one-way hyperplane, distances between the one-way hyperplane and each of a pair of divided areas have asymmetry, and the one-way hyperplane data being calculated such that the one-way hyperplane overlaps the normal hyperplane represented by the normal hyperplane data in the feature quantity space, converting, based on the normal hyperplane data and the one-way hyperplane data, query data including a plurality of feature quantities and the plurality of record data into respective binary strings, the query data and the plurality of record data being respectively converted to first binary strinqs usinq the normal hyperplane data, the query data and the plurality of record data being respectively converted to second binary strings using the one-way hyperplane data, and outputting a predetermined number of record data in an order of a dissimilarity value, wherein the dissimilarity value is a sum of a dissimilarity between the first binary string of the query data and the first binary string of the record data and the dissimilarity between the second binary string of the query data and the second binary string of the record data, for each of the record data.

7. The storage medium storing the similarity search program according to claim 6, wherein in the second calculating, the one-way hyperplane data is calculated such that the number and directions of the one-way hyperplanes are respectively determined based on an asymmetric component of a quasi-metric in the feature quantity space of a pair of the record data positioned in different areas which are a pair of areas in the feature quantity space divided by the normal hyperplane represented by the normal hyperplane data.

8. The storage medium storing the similarity search program according to claim 7,
  wherein in the first calculating, normal hyperplane data representing a plurality of normal hyperplanes is calculated, and
  in the second calculating, when a feature quantity space is divided by the normal hyperplane represented by the normal hyperplane data into the pair of areas, integrating asymmetric components of quasi-metrics in the feature quantity space of a pair of the record data positioned in different areas for a plurality of combinations of pairs of the record data is performed individually for the respective normal hyperplanes, and based on an integrated value of the asymmetric components of the quasi-metrics corresponding to the respective normal hyperplanes, the number and directions of the one-way hyperplanes are determined.

9. The storage medium storing the similarity search program according to claim 8,
  wherein in the second calculating, using a parliamentary seat decision method of a party-list proportional representation system, parliamentary seats are assigned to each normal hyperplane on the assumption that the absolute value of the integrated value of asymmetric components of the quasi metric is the number of votes obtained for a normal hyperplane, and a decision is made that the assigned number of seats is the number of one-way hyperplanes corresponding to the normal hyperplane.

10. The storage medium storing the similarity search program according to claim 9,
  wherein parliamentary seats are assigned to each normal hyperplane using the d'Hondt method as a parliamentary seat decision method for the party-list proportional representation system.

11. A similarity search method that causes a computer to perform a process comprising:
  first calculating, based on a plurality of record data, each of the record data including a plurality of feature quantities, normal hyperplane data representing a normal hyperplane, the normal hyperplane being a hyperplane dividing a feature quantity space, and distances between the normal hyperplane and each of a pair of divided areas having symmetry,
  second calculating, based on the plurality of record data and the normal hyperplane data, one-way hyperplane data representing at least one one-way hyperplane which is a hyperplane such that when the feature quantity space is divided by the one-way hyperplane, distances between the one-way hyperplane and each of a pair of divided areas have asymmetry, the one-way hyperplane data being calculated such that the one-way hyperplane overlaps the normal hyperplane represented by the normal hyperplane data in the feature quantity space, and
  converting, based on the normal hyperplane data and the one-way hyperplane data, query data including a plurality of feature quantities and the plurality of record data into respective binary strings, the query data and the plurality of record data being respectively converted to first binary strings using the normal hyperplane data, the query data and the plurality of record data being respectively converted to second binary strings using the one-way hyperplane data, and
  outputting a predetermined number of record data in an order of a dissimilarity value, wherein the dissimilarity value is a sum of a dissimilarity between the first binary string of the query data and the first binary string of the record data and the dissimilarity between the second binary string of the query data and the second binary string of the record data, for each of the record data.

* * * * *